US011397763B1

(12) United States Patent
Barlaskar et al.

(10) Patent No.: US 11,397,763 B1
(45) Date of Patent: *Jul. 26, 2022

(54) LIVE VIDEO RECOMMENDATION BY AN ONLINE SYSTEM

(71) Applicant: Meta Platforms, Inc., Menlo Park, CA (US)

(72) Inventors: Uzma Hussain Barlaskar, Berkeley, CA (US); Aditya Palnitkar, Sunnyvale, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/014,395

(22) Filed: Sep. 8, 2020

Related U.S. Application Data

(63) Continuation of application No. 15/823,256, filed on Nov. 27, 2017, now Pat. No. 10,803,111.

(51) Int. Cl.
| | |
|---|---|
| *G06F 16/435* | (2019.01) |
| *G06F 16/2457* | (2019.01) |
| *H04L 65/60* | (2022.01) |
| *H04N 21/25* | (2011.01) |
| *H04L 65/612* | (2022.01) |
| *H04N 21/2187* | (2011.01) |
| *G06V 20/40* | (2022.01) |
| *G06V 40/16* | (2022.01) |

(52) U.S. Cl.
CPC ...... *G06F 16/437* (2019.01); *G06F 16/24578* (2019.01); *G06V 20/41* (2022.01); *G06V 20/47* (2022.01); *G06V 40/172* (2022.01); *H04L 65/4084* (2013.01); *H04L 65/605* (2013.01); *H04N 21/2187* (2013.01); *H04N 21/25* (2013.01)

(58) Field of Classification Search
CPC . G06F 16/437; G06F 16/24578; G06V 20/41; G06V 20/47; G06V 40/172; H04L 65/4084; H04L 65/605; H04N 21/2187; H04N 21/25

See application file for complete search history.

(56) References Cited

U.S. PATENT DOCUMENTS 9,129,227 B1 * 9/2015 Yee ..................... G06N 20/00
2008/0294617 A1 * 11/2008 Chakrabarti ........ G06F 16/9535
(Continued)

*Primary Examiner* — Mark D Featherstone
*Assistant Examiner* — Samuel C Sharpless, III
(74) *Attorney, Agent, or Firm* — Fenwick & West LLP

(57) ABSTRACT

An online system is configured to recommend a live video to a target user by presenting the live video in the target user's newsfeed or other location. The online system receives a plurality of live videos for streaming to its users. To recommend a live video, the online system dynamically identifies a topic of each of the plurality of live videos during the streaming. The online system further selects a group of candidate live videos, each of which has an identified topic matching an interest of the target user. The online system ranks the candidates based on a probability that the target user would positively interact with each candidate live video if the candidate live video is presented to the target user. Then the online system provides a candidate above a threshold level in the ranking for display to the target user, e.g., in a newsfeed of the target user.

20 Claims, 4 Drawing Sheets

(56) References Cited

U.S. PATENT DOCUMENTS

| | | | |
|---|---|---|---|
| 2010/0199295 A1* | 8/2010 | Katpelly | G06N 5/02 |
| | | | 725/14 |
| 2014/0172875 A1 | 6/2014 | Rubinstein et al. | |
| 2015/0020106 A1 | 1/2015 | Belyaev et al. | |
| 2016/0014482 A1* | 1/2016 | Chen | H04N 21/26258 |
| | | | 386/241 |
| 2016/0092938 A1* | 3/2016 | Tang | G06Q 30/0277 |
| | | | 705/14.73 |
| 2018/0025005 A1 | 1/2018 | Cao et al. | |
| 2018/0276478 A1 | 9/2018 | Cunico et al. | |

* cited by examiner

Image Frame 410

Image Frame 420

Image Frame 430

LIVE VIDEO RECOMMENDATION BY AN ONLINE SYSTEM

CROSS REFERENCE TO RELATED APPLICATIONS

This application is a continuation of co-pending U.S. application Ser. No. 15/823,256, filed Nov. 27, 2017, which is incorporated by reference in its entirety.

BACKGROUND

This disclosure relates generally to online systems, and more particularly to live video recommendation by an online system.

Online systems have become increasingly prevalent in digital content distribution and consumption, and allow users to more easily communicate with one another. Users of an online system associate with other online system users, forming a web of connections. Additionally, users may share personal information and other stories with other users connected to them via an online system. Examples of information shared by online system users include videos, music, contact information, background information, job information, interests, photos, notes, and/or other member-specific data.

An online system receives videos for presenting to users of the online system. The videos can be created by the online system, uploaded by online system users, or received from third parties. Online system users may engage with videos presented to them in various ways. For example, an online system user may play, express preference for, comment on, share, hide or leave videos presented to them. An online system user can also decide what videos to share with other users connected to the user at the online system, e.g., through a newsfeed of the user.

It encourages an online system user to use the online system if the online system can present videos that are of interest to the online system user. Current methods of evaluating whether a video is of interest to an online system user usually consider the video as a whole and focus on popularity of the video. However, these current methods fail to consider that an online system user may be interested in a portion of a video but not interested in another portion of the video or the video as a whole. Especially for live videos, content of a live video is often unknown to online system until it is streamed to online system users and different portions of a single live video can have different content. The current methods have a drawback of failing to recommend live videos of interest to a particular user during streaming of the live videos.

SUMMARY

An online system receives a plurality of live videos for streaming to client devices associated with users of an online system and recommends a live video to a target user during the streaming, e.g., by presenting the live video in a newsfeed of the target user.

The online system receives a request for content (e.g., via a newsfeed) from the target user during the streaming of the plurality of live videos. In response to the request, the online system dynamically identifies a topic for each of the plurality of live videos. In some embodiments, the online system identifies a topic for the live video based on an image frame being streamed at the time when the target user's request is received. As content of a live video changes, the online system may identify different topics for the same live video at different times. Based on identified topics of the plurality of live videos, the online system selects a group of live videos as candidates for presentation to the target user, e.g., in the requested newsfeed. Each candidate has an identified topic matching at least one interest of the target user. The interest of the target user can be explicit or implicit.

The online system ranks the candidates based on their ranking scores. A ranking score indicates a probability that the target user would positively interact with the corresponding candidate if the candidate is presented to the target user in the newsfeed. To determine a ranking score for a candidate, the online system may identify multiple types of interactions, including positive interaction, e.g., viewing the candidate, liking the candidate, commenting on the candidate, and sharing the candidate. For each type of positive interaction, the online system uses machine learning techniques to determine a probability that the target user would perform the type of positive interaction with the candidate if the candidate is presented to the target user. Further, the online system obtains an aggregation of the probabilities of the multiple types of positive interaction as the ranking score for the candidate.

In some embodiments, the online system provides a highest ranked candidate for display in the newsfeed requested by the target user. In some alternative embodiments, the online system provides more than one candidate that are above a threshold level in the ranking for display in the target user's newsfeed.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
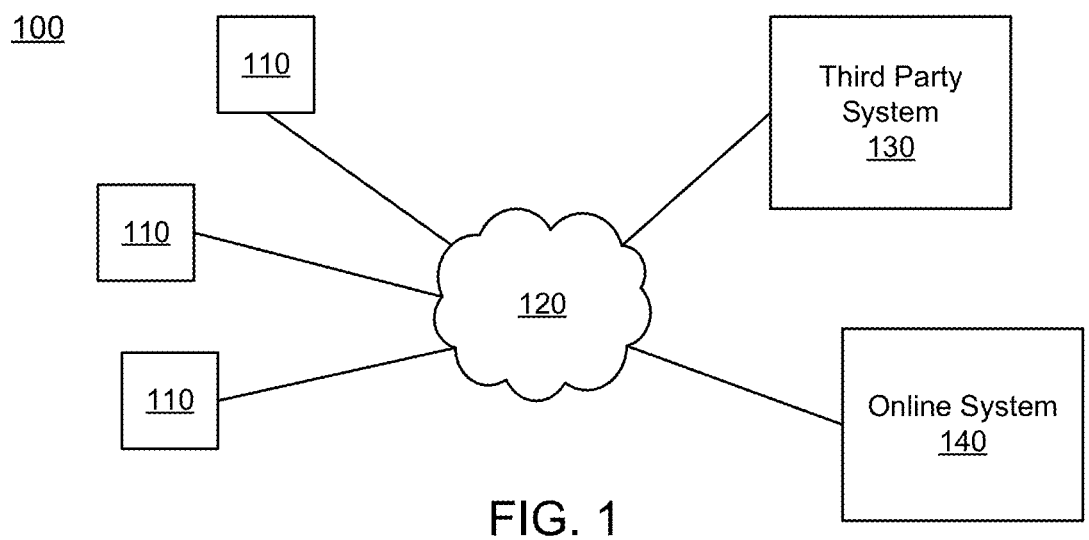
FIG. 1 is a block diagram of a system environment in which an online system operates, in accordance with an embodiment.

FIG. 1 is a block diagram of a system environment 100 in which an online system 140 operates, in accordance with an embodiment. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer.

Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

In some embodiments, a client device 110 allows an online system user to stream live videos from the client device 110 to the online system 140. Also, the client device 110 executes a software module that allows the online system user to receive live videos streamed by other online system users or third party systems 130. With the software module, the online system user may view, pause, or leave a live video during the streaming of the live video.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
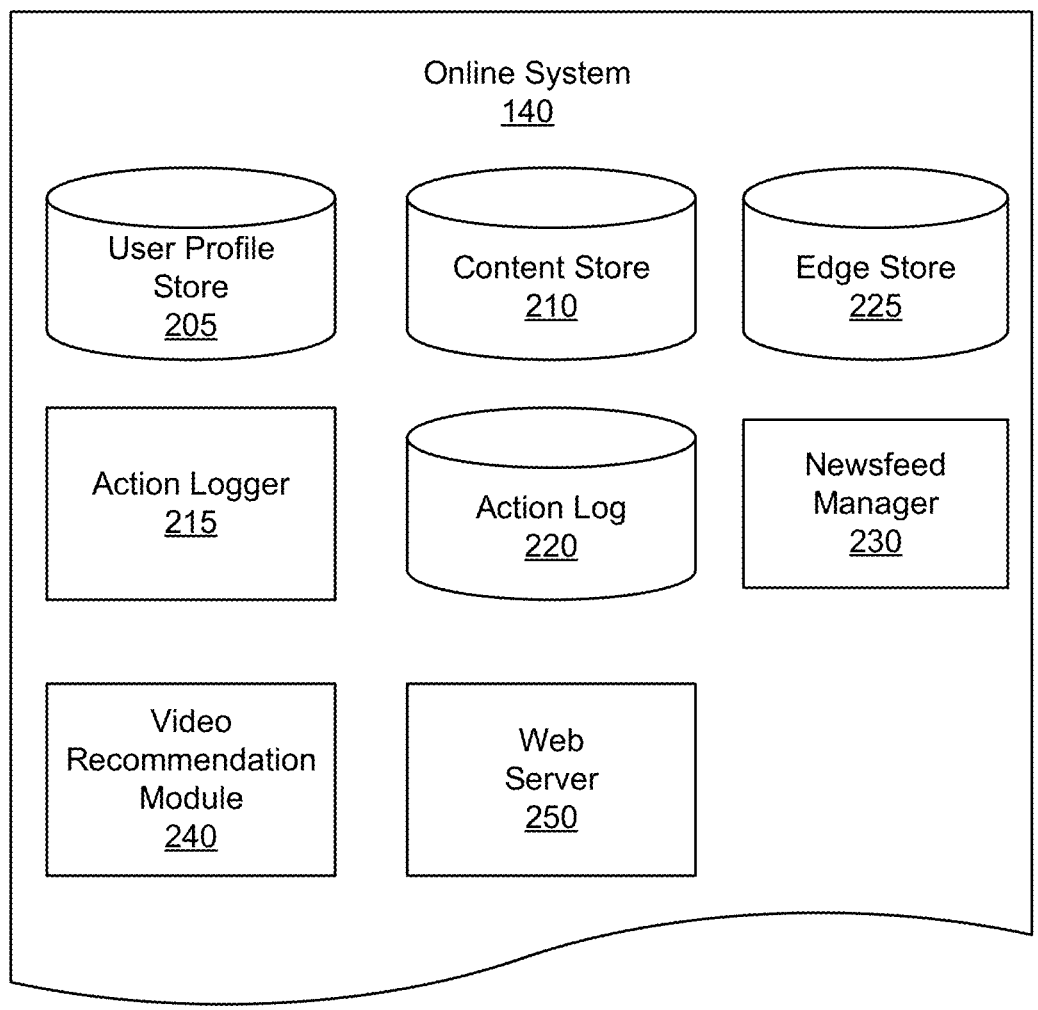
FIG. 2 is a block diagram of an online system having a video recommendation module, in accordance with an embodiment.

FIG. 2 is a block diagram of an online system 140 having a video recommendation module 240, in accordance with an embodiment. The online system 140 shown in FIG. 2 includes a user profile store 205, a content store 210, an action logger 215, an action log 220, an edge store 225, a newsfeed manager 230, the video recommendation module 240, and a web server 250. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like.

Another example of information stored in a user profile is an embedding vector of the user (referred to as "user vector"). The user vector describes the user in a vector space where each dimension or axis of the vector space is a latent or inferred characteristic of the user in the space. Latent characteristics are characteristics that are not observed, but are rather inferred through a mathematical model from other variables that can be observed. In one embodiment, the user vector has 128 dimensions. The user vector can be generated based on embedding vectors of content items that the user has engaged with or otherwise associated with.

A user profile may store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects. Each of the objects represents various types of content. Examples of content represented by an object include a page post, a status update, a photograph, a video, an audio, a link, a shared content item, a gaming application achievement, a check-in event at a local business, a brand page, or any other type of content. Content stored in the content store 310, regardless of its composition, may be referred to herein as one or more "content items," or as "content." The content store 210 may also store information describing or otherwise related to the content.

Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140. Content items can be presented, e.g., through newsfeed, to an online system user and other online system uses that are connected to the online system user.

The action logger 215 receives communications about user actions internal to and/or external to the online system 140, populating the action log 220 with information about user actions. Examples of actions include adding a connection to another user, sending a message to another user, uploading an image, reading a message from another user, playing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: expressing preference or disfavor of posts, commenting on posts, hiding posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. A user may perform different actions on different types of content items. For example, for videos, actions that a user may perform include playing the video, commenting on the video, liking the video, sharing the video, hiding the video, leaving the video, deleting the video, etc. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage playing histories, advertisements that were interacted, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections or social graph indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

In one embodiment, the online system 140 identifies stories likely to be of interest to a user through a "newsfeed" presented to the user. A story presented to a user describes an action taken by an additional user connected to the user and identifies the additional user. In some embodiments, a story describing an action performed by a user may be accessible to users not connected to the user that performed the action. The newsfeed manager 230 may generate stories for presentation to a user based on information in the action log 220 and in the edge store 225 or may select candidate stories included in the content store 210. One or more of the candidate stories are selected and presented to a user by the newsfeed manager 230.

For example, the newsfeed manager 230 receives a request to present one or more stories to an online system user. The newsfeed manager 230 accesses one or more of the user profile store 205, the content store 210, the action log 220, and the edge store 225 to retrieve information about the identified user. For example, stories or other data associated with users connected to the identified user are retrieved. The retrieved stories or other data are analyzed by the newsfeed manager 230 to identify candidate content items, which include content having at least a threshold likelihood of being relevant to the user. For example, stories associated with users not connected to the identified user or stories associated with users for which the identified user has less than a threshold affinity are discarded as candidate stories. Based on various criteria, the newsfeed manager 230 selects one or more of the candidate stories for presentation to the identified user.

In various embodiments, the newsfeed manager 230 presents stories to a user through a newsfeed including a plurality of stories selected for presentation to the user. The newsfeed may include a limited number of stories or may include a complete set of candidate stories. The number of stories included in a newsfeed may be determined in part by a user preference included in user profile store 205. The newsfeed manager 230 may also determine the order in which selected stories are presented via the newsfeed. For example, the newsfeed manager 230 determines that a user has a highest affinity for a specific user and increases the number of stories in the newsfeed associated with the specific user or modifies the positions in the newsfeed where stories associated with the specific user are presented.

The newsfeed manager 230 may also account for actions by a user indicating a preference for types of stories and selects stories having the same, or similar, types for inclusion in the newsfeed. Additionally, the newsfeed manager 230 may analyze stories received by the online system 140 from various users to obtain information about user preferences or actions from the analyzed stories. This information may be used to refine subsequent selection of stories for newsfeeds presented to various users.

The newsfeed manager 230 can also receive a request from the video recommendation module 240 to present one or more live videos in a newsfeed for a target user. The one or more live videos are recommended by the video recommendation module 240 to the target user. In some embodiments, the newsfeed manager 230 presents a recommended live video at a dominant position of the newsfeed, e.g., at the top of the newsfeed. A live video presented in the newsfeed is streamed to the target user upon the target user accesses the newsfeed.

The video recommendation module 240 recommends a live video to a target user based on a probability that the target user would positively interact with the live video if the live video is presented in a newsfeed of the target user. For example, the video recommendation module 240 receives live videos for streaming to client devices 110 associated with users of the online system 140. During the streaming of the live videos, the video recommendation module 240 receives a request for content from the target user. In some embodiments, the request for content is a request for a newsfeed. The request may be sent to the video recommendation module 240 through the newsfeed manager 230 or the web server 250. In response to the request, the video recommendation module 240 identifies topics of the live videos to select candidates for recommending to the target user, ranks the candidates, and recommend to the target user one or more of the candidates that are above a threshold level in the ranking.

Identification of topics of the live videos is based on content of the live videos. For example, the video recommendation module 240 uses face recognition and/or image recognition techniques to detect a person or an object in the live video. Based on the detected person or object, the video recommendation module 240 determines a topic for the live video.

The video recommendation module 240 selects live videos with topics that match an interest of the target user as candidates for presentation in the newsfeed. Then the video recommendation module 240 ranks the candidates. Ranking of the candidates is based on ranking scores of the candidates. A ranking score of a candidate indicate a probability that the target user would positively interact with the candidate if the candidate is presented to the target user in the newsfeed.

In some embodiments, the video recommendation module 240 identifies multiple types of positive interaction that the target user may perform with each candidate. Example types of positive interaction include viewing a candidate for at least a threshold amount of time, liking or reacting to a candidate, sharing a candidate, commenting on a candidate, other types of positive interaction, or any combination thereof. For each type of positive interaction, the video recommendation module 240 determines a probability that the target user would perform the type of positive interaction with the candidate if the candidate is presented to the target user. Further, the video recommendation module 240 obtains an aggregation of the probabilities of all the types of positive interaction. The aggregation is used to determine the ranking score of the candidate.

A candidate associated with a higher ranking score is ranked higher. The video recommendation module 240 selects one or more candidates above a threshold level in the ranking for recommending to the target user. A recommended live video is provided for display in the newsfeed during streaming of the live video.

In some embodiments, live video recommendation by the video recommendation module 240 is dynamic, meaning live videos recommended by the video recommendation module 240 to the target user may vary at different times. For example, a live video is recommended to the target user in response to a first request received in the beginning of the streaming of the live video, but is not recommended to the target user in response to a second request made later in the streaming of the live video. The dynamic live video recommendation is based on dynamic identification of topics of the live videos received by the video recommendation module 240. As content of the live video may change over time, the video recommendation module 240 can identify different topics at different times during the streaming of the live video. For instance, in response to the first request, the video recommendation module 240 identifies a first topic for a first image frame of the live video. The first topic matches an interest of the target user and therefore is selected as a candidate for the first request. In response to the second request, the video recommendation module 240 identifies a second topic for a second image frame of the live video. But the second topic is different from the first topic and does not match an interest of the target user. Accordingly, the live video is not selected as a candidate for the second request. More details about the video recommendation module 240 are described in conjunction with FIG. 3.

The web server 250 links the online system 140 via the network 120 to the one or more client devices 110, as well as to the one or more third party systems 130. The web server 250 serves web pages, as well as other content, such as JAVA®, FLASH®, XML and so forth. The web server 250 may provide application programming interface (API) functionality to send data directly to native client device operating systems, such as IOS®, ANDROID™, or BlackberryOS. Additionally, the web server 250 may receive and route messages between the online system 140 and the client device 110, for example, instant messages, queued messages (e.g., email), text messages, short message service (SMS) messages, or messages sent using any other suitable messaging technique. The webserver 250 can facilitate streaming of live videos from a client device 110 to the online system 140. The webserver can also receive a user's request for a newsfeed and provide the requested generated by the newsfeed manager 240 to a client device 110 associated with the user. The newsfeed may include live videos recommended to the user.

Live Video Recommendation

Figure 3:
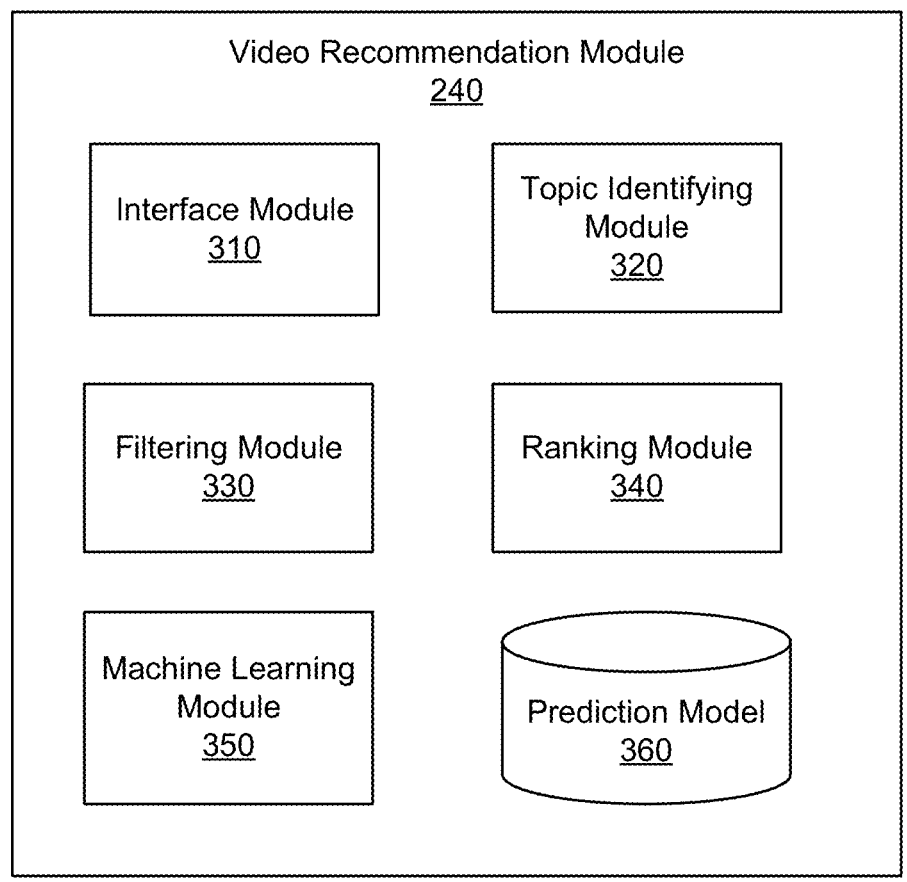
FIG. 3 is a block diagram of the video recommendation of the online system, in accordance with an embodiment.

FIG. 3 is a block diagram of the video recommendation module 240 of the online system 140, in accordance with an embodiment. The video recommendation module 240 in the embodiment of FIG. 3 includes an interface module 310, a topic identifying module 320, a filtering module 330, a ranking module 340, a machine learning module 350, and a prediction model 360. In other embodiments, the video recommendation module 240 may include additional, fewer, or different components for various applications.

The interface module 310 facilitates communication of the video recommendation module 240 with other entities. For example, the interface module 310 receives live videos that are being streamed to client devices associated with users of an online system. Also, the interface module 310 receives 520 a request for content (e.g., a request for a newsfeed) from a target user during the streaming of the live videos. The interface module 310 can forward the live videos and the request for content to other components of the video recommendation module 240, e.g., the topic identifying module 320, the filtering module 330, and the ranking module 340. As another example, the interface module 310 dispatch a request to present a live video recommended by the video recommendation module 240 to the newsfeed manager 230 for presenting the live video in a newsfeed requested by the target user.

The topic identifying module 320 identifies a topic for each of the live videos received by the video recommendation module 240. In some embodiments, the topic identifying module 320 selects one image frame from a live video to identify a topic for the live video. The selected image frame can be the image frame that is being streamed at the time that the video recommendation module 240 receives the target user's request for the newsfeed. Alternatively, the image frame can be selected from a group of image frames around the time that the target user's request is received. Out of the group of image frames, the topic identifying module 320 selects a representative image frame.

After selecting an image frame, the topic identifying module 320 identifies a topic of the selected image frame, e.g., by detecting one or more subjects included in the selected image frame. A subject can be a person or an object. In some embodiments, the topic identifying module 320 uses facial recognition techniques to detect a person's face included in the selected image. The topic identifying module 320 can also detect other features of the person, such as clothes, heights, actions performed by the person, and so on. The topic identifying module 320 may use image recognition techniques to detect an object included in the image frame. Examples of an object include landscapes and geological formations (mountain, lake, ocean, sky, cloud, and the like), structures (street, building, bridge, and the like), living objects (plant, animal, and the like), and so on.

Based on the detected one or more subjects, the topic identifying module 320 determines a topic for the live video. For example, in instances where the topic identifying module 320 detects a person playing football in the selected image frame, the topic identifying module 320 determines that the topic for the live is football. In some instances, the topic identifying module 320 inputs the selected image frame into a machine learning model trained for identifying topics of image frames. The machine learning model outputs a topic for the live video.

In some instances, the topic identifying module 320 detects multiple subjects in the selected image frame. The topic identifying module 320 may identify a topic based on a combination of the subjects or choose one of the subjects as a dominant subject to identify a topic. A dominant subject can be a subject that is located at a dominant position in the image frame or takes over at least a threshold area percentage of the image frame.

Topic identification by the topic identifying module 320 is dynamic. While a live video is being streamed, content of the live video can change over time. In some embodiments, for each request for a newsfeed from the target user, the topic identifying module 320 selects an image frame being streamed at the time that the request is received and identifies a topic of the live video based on the selected image frame. Thus, for the target user's requests received at different times, the topic identifying module 320 may identify different topics for a same live video. For example, in response to a first request from the target user, the topic identifying module 320 identifies a first topic for a first image frame of the live video and in response to a second request from the target user, the topic identifying module 320 identifies a second topic for a second image frame of the live video. The first topic and the second topic are different.

Figure 4:
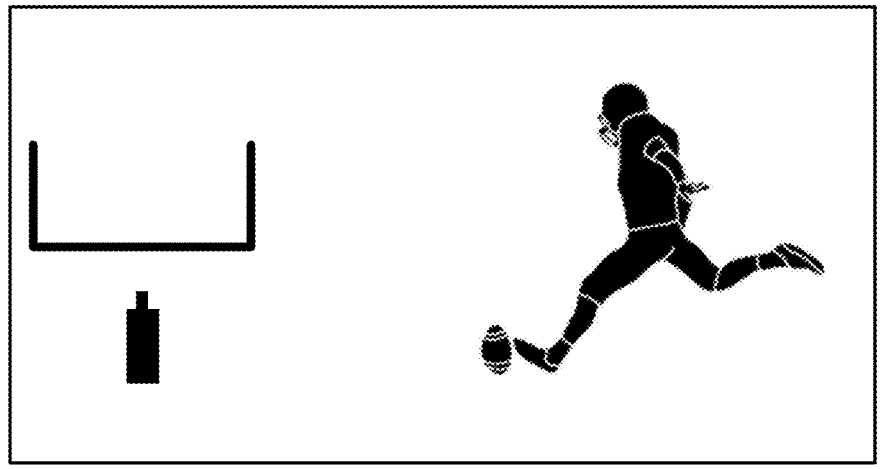
FIG. 4 shows an example live video, for which different topics are identified by the video recommendation module at different times during the streaming of the live video, in accordance with an embodiment.
Figure 4:
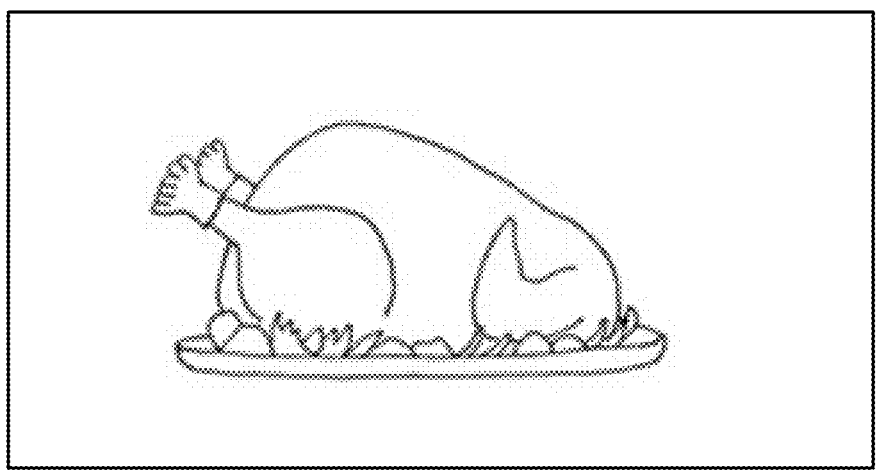
Figure 4:
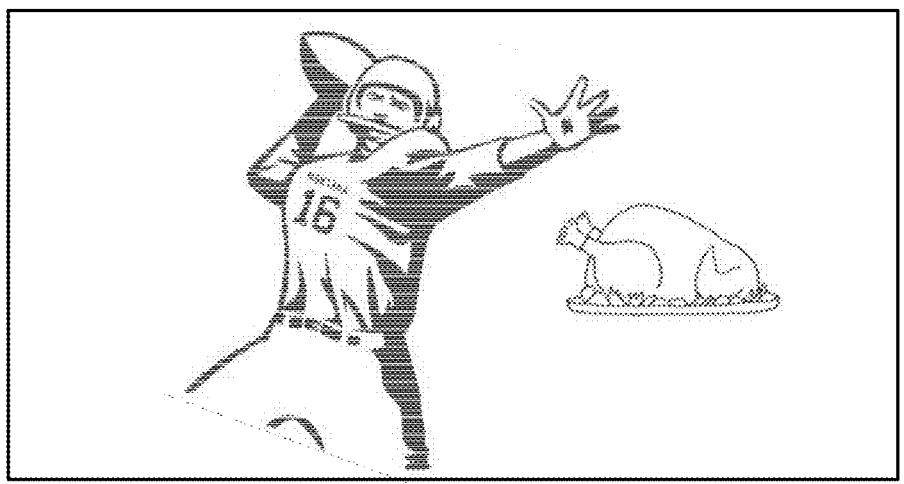

FIG. 4 shows an example live video, for which different topics are identified by the video recommendation module 240 at different times during the streaming of the live video, in accordance with an embodiment. The video recommendation module 240 receives three requests for newsfeeds from a target user at 4:10 pm, 4:20 pm, and 4:30 pm, respectively. Three image frames 410-430 of the live video are streamed to online system users at the three times: the image frame 410 is streamed to the users at 4:10 pm, the image frame 420 is streamed to the users at 4:20 pm, and the image frame 430 is streamed to the users at 4:30 pm.

In response to each request, the topic identifying module 320 identifies a topic based on the image frame that is being stream at the time that the request is received. For example, in response to the request received at 4:10 pm, the topic identifying module 320 identifies a topic based on the image frame 410. The topic identifying module 320 detects a person in the image frame 410. Also, the topic identifying module 320 detects a football and a goal post in the image frame 410. Based on the detected person, football, and goal post, the topic identifying module 320 identifies "football" as the topic of the live video.

Similarly, in response to the request received at 4:20 pm, the topic identifying module 320 identifies a topic based on the image frame 420. The topic identifying module 320 detects a plate containing a whole roasted turkey and vegetables in the image frame 420. Accordingly, the topic identifying module 320 identifies "Thanksgiving turkey" as the topic of the live video.

In response to the request received at 4:30 pm, the topic identifying module 320 identifies a topic based on the image frame 430. In the image 430, the topic identifying module 320 detects a football player as well as a plate containing a whole roasted turkey and vegetables. The topic identifying module 320 may identify "football" as the topic of live video because the football player takes over most of the image frame 430 and can be considered as a dominant subject of the image frame 430. Alternatively, the topic identifying module 320 may identify "Thanksgiving football game" as the topic of the image frame 430 based on a combination of the football player and the plate containing the whole roasted turkey.

Turning back to FIG. 3, the filtering module 330 selects a group of live videos as candidates for presentation in a newsfeed requested by the target user based on topics of the live videos identified in response to the request. In some embodiments, the filtering module 330 selects a live video as a candidate based on the identified topic of the live video matching one or more interests of the target user. Interests of the target user can be derived from the user profile store 205 and the action log 220. An interest of the target user can be explicit or implicit. For example, hobbies and preferences of the target user stored in the user profile store 205 are explicit interests of the user. And historical actions performed by the target user stored in the action log 220 can indicate implicit interests of the target user. For example, a history of watching many football videos indicates that the target user has an interested in football.

As identification of the topics of the live videos is dynamic, the filtering module 330 may select different candidate for different requests received from the target user. As discussed above, different topics can be identified for a same live video in response to the target user's requests received at different times. Thus, a live video selected by the filtering module 330 for a request from the target user may not be selected as a candidate for another request from the target user due to change in topic. Taking the live video in the embodiment of FIG. 4 for example, based on the request received at 4:10 pm, the filtering module 330 selects the live video as a candidate because its topic is "football," which matches an interest of the target user. However, in response to the request received at 4:20 pm, the filtering module 330 does not select the live video as a candidate because its topic changes to "Thanksgiving turkey," which does not match an interest of the target user. Later, based on the request received at 4:30 pm, the filtering module 330 selects the live video as a candidate again because the topic of the live video is now "Thanksgiving football," which matches the target user's interest in football.

The ranking module 340 determines a ranking score for each candidate and ranks the candidates based on their ranking scores. A ranking score of a candidate indicates a probability that the target user would positively interaction with each candidate if the candidate is presented to the target user in the newsfeed. In some embodiments, the ranking score of a candidate is an aggregation of probabilities for a plurality of types of positive interaction that the target user would conduct with the candidate if the candidate is presented to the target user in the newsfeed. The ranking module 340 identifies the types of positive interaction, which include but are not limited to viewing the candidate for at least a threshold amount of time (e.g., 30 seconds), liking or reacting to the candidate, sharing the candidate, commenting on the candidate, or any combination thereof. For each type of positive interaction, the ranking module 340 determines a probability that the target user would conduct the type of positive interaction with the candidate if the candidate is presented to the target user.

The ranking module 340 uses the machine learning module 350 to predict probabilities of the types of positive interaction for a candidate. The machine learning module 350 applies machine learning techniques to train the prediction model 360 that when applied to one or more characteristics of the target user outputs probabilities of the types of positive interaction. The one or more characteristics of the target user can include descriptive information of the target user and historical actions performed by the target user, which can be retrieved from the user profile store 205 and the action log 220.

The prediction model 360 may include multiple models, each of which is trained by the machine learning module 350 to predict a probability of one type of positive interaction. For example, the prediction model 360 includes a view model for predicting a probability of viewing the candidate for at least 30 seconds, a like model for predicting a probability of liking the candidate, a share model predicting a probability of sharing the candidate, and a comment model for predicting a probability of commenting on the candidate.

Taking the view model for example, the machine learning module 350 forms a training data set that can be saved at a training data store. The training data sets include information about characteristics of other users and interactions taken by the other users on the candidate or on other live videos. The information can be retrieved from the user profile store 205 and the action log 220. The machine learning module 350 extracts features from the training data sets. Example features include (a) a number of users who viewed the candidate for at least 30 seconds in the last 5 minutes, (b) a number of users who viewed the candidate that was recommended to them by the online system 140 and not simply because they are connected to a user who posted the candidate, (c) a number of users who shared, commented on, liked, or reacted to the candidate in the last five minutes, and (d) a number of users who left the live streaming or joined the live streaming of the candidate in the last 5 minutes. In some embodiments, the machine learning module 350 also extracts content features from the candidate. For example, the machine learning module 350 extracts text from speeches included in the candidate.

The machine learning module 350 may assign a different weight to each feature. For different models, a same feature can be assigned different weights. One factor to determine a weight of a feature is the type of interaction in the feature. For example, the feature of a number of users who viewed the candidate for at least 30 seconds in the last 5 minutes has a higher weight in the view model but a lower weight in the other models. Another factor to determining a weight of a feature is similarity of characteristics of the target user to characteristics of the other users in the training data set. The similarly can be determined by comparing an embedding vector of the target user with embedding vectors of the other users. The feature has a higher weight when the target user is determined more similar to the other users performing the action in the feature. There can be other factors to determine a weight of a feature.

In some embodiments, the machine learning module 350 uses supervised machine learning to train the prediction model 360. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The prediction model 360 can be saved in the online system 140. The machine learning module 350 can periodically re-train the prediction model 360 using features based on updated training data.

In some embodiments, a validation set is formed of information of additional users, other than those in the training set, who performed actions with the candidate and the actions performed by the additional users. The machine learning module 350 applies the trained prediction model 360 to the validation set to quantify the accuracy of the prediction model 360. Common metrics applied in accuracy measurement include: Precision=TP/(TP+FP) and Recall=TP/(TP+FN), where precision is how many the prediction model 360 correctly predicted (TP or true positives) out of the total it predicted (TP+FP or false positives), and recall is how many the prediction model 360 correctly predicted (TP) out of the total number of segments that was of interest to the target user (TP+FN or false negatives). The F score (F-score=2*PR/(P+R)) unifies precision and recall into a single measure. In one embodiment, the machine learning module 350 iteratively re-trains the prediction model 360 until the occurrence of a stopping condition, such as the accuracy measurement indication that the model is sufficiently accurate, or a number of training rounds having taken place.

Based on outputs of the prediction model 360, the ranking score of the candidate is determined. In one embodiment, the ranking score is determined based on Equation (1).

$$y = \sum_{i=1}^{N} w_i \times p_i \quad (1)$$

where N is the number of the types of positive interaction; $w_i$ is weight of a type of positive interaction; $p_i$ is a probability that the target user would conduct a type of positive interaction with the candidate if the candidate is presented to the target user; y is the ranking score of the candidate. A candidate associated with a higher ranking score (which indicates that the target user would more likely to positively interact with the candidate) is ranked higher than another candidate associated with a lower ranking score.

In some embodiments, the ranking module 340 further determines a second ranking score for each candidate indicating a probability that the target user would negatively interact with the candidate if the candidate is presented to the target user and includes the second ranking score in the ranking of the candidates. In one example, the ranking module obtains a sum of the ranking score and the second ranking score for each candidate and ranks the candidate based on the sums. In another example, the ranking module 340 decreases the ranking of a candidate that has a second ranking score above a threshold level.

To determine the second ranking score, the ranking module 340 may identify a plurality of types of negative interaction, such as viewing the candidate for less than a threshold amount of time, pausing the candidate, leaving the candidate, deleting the candidate from the newsfeed, or any combination thereof. The ranking module 340 determines a probability that the target user would conduct each identified type of negative interaction with the candidate if the candidate is presented to the target user, e.g., by using machine learning techniques. Further, the ranking module 340 determines the second ranking score by aggregating the probabilities of the identified types of negative interaction, e.g., by using an equation similar to Equation (1).

Figure 5:
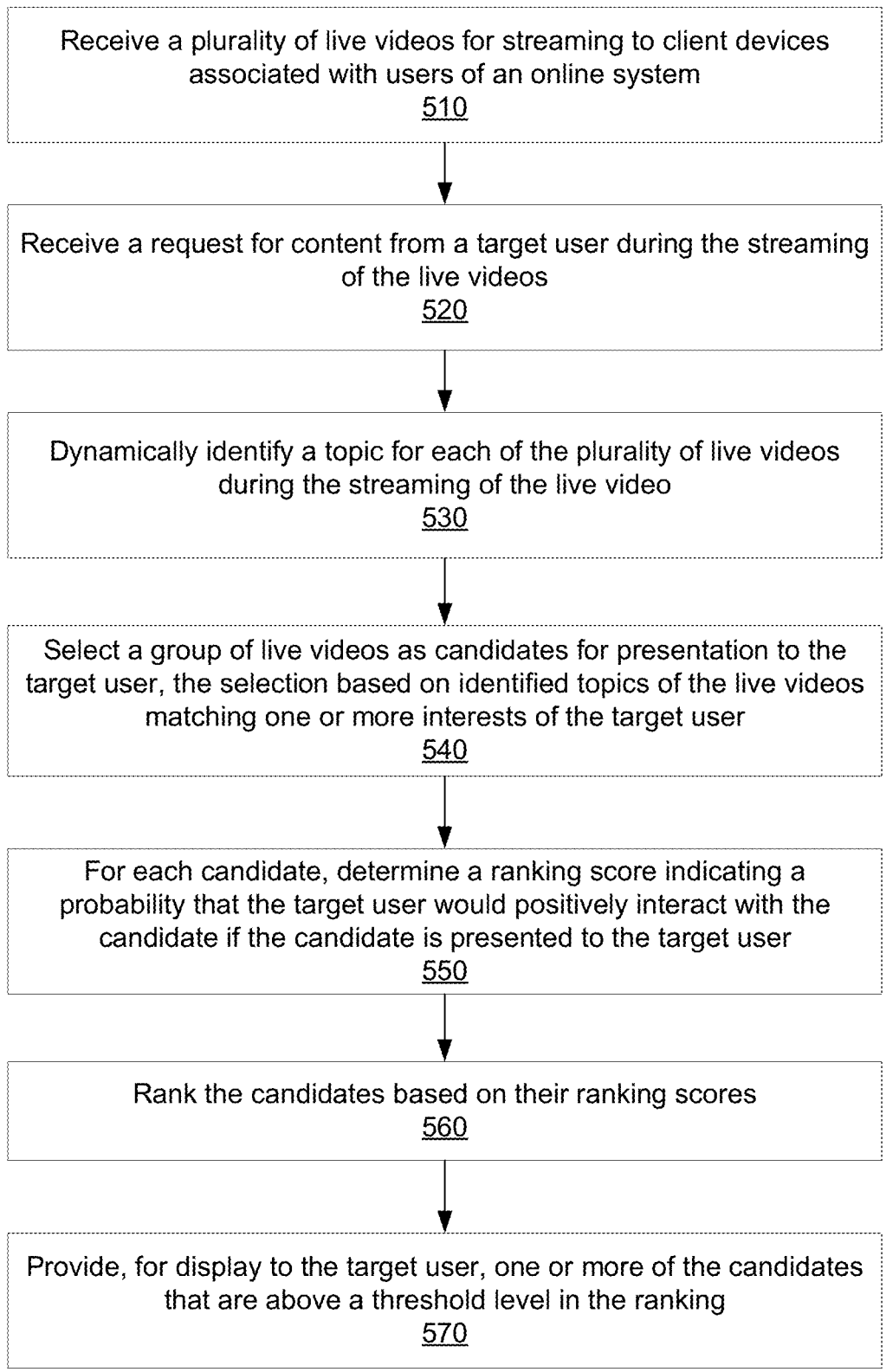
FIG. 5 is a flowchart illustrating a process for recommending a live video for a target user, in accordance with an embodiment.

FIG. 5 is a flowchart illustrating a process for recommending a live video for a target user, in accordance with an embodiment. In some embodiments, the process is performed by the video recommendation module 240 of the online system 140, although some or all of the operations in the method may be performed by other entities in other embodiments. In some embodiments, the operations in the flow chart are performed in a different order and can include different and/or additional steps.

The video recommendation module 240 receives 510 a plurality of live videos for streaming to client devices associated with users of an online system. The video recommendation module 240 also receives 520 a request for content from a target user during the streaming of the live videos. The request for content can be a request for a newsfeed. In some embodiments, the request for content is generated based on the target user logging into his account with the online system 140. Then the request is sent to the video recommendation module 240.

In response to the request for content, the video recommendation module 240 dynamically identifies 530 a topic for each of the plurality of live videos during the streaming of the live video. For example, the video recommendation module 240 analyzes an image frame that is being streamed at the time that the target user's request is received and identifies a topic based on the image frame. The video recommendation module 240 can use face recognition techniques and/or image recognition techniques to detect one or more subjects in the image frame and determines the topic based on the detected one or more subjects.

The video recommendation module 240 selects 540 a group of live videos as candidates for presentation to the target user. The selection is based on identified topics of the live videos matching one or more interests of the target user. For example, a live video with a topic of football game is selected as a candidate because the target user has an interested in football. An interest of the target user can be explicit or implicit and can be retrieved from the user profile store 205 or the action log 220.

For each candidate, the video recommendation module 240 determines 550 a ranking score indicating a probability that the target user would positively interact with the candidate if the candidate is presented to the target user in the newsfeed. In some embodiments, the video recommendation module 240 identifies a plurality of types of positive interaction and determines a probability that the target user would perform each type of positive interaction with the candidate. Then the video recommendation module 240 aggregates the probabilities of the identified types of positive interaction for determining the ranking score. In one embodiment, for each type of positive interaction, the video recommendation module 240 assigns a weight and computes a product of the weight with the corresponding probability. The ranking score equals a sum of the products of the identified types of positive interaction.

The video recommendation module 240 ranks 560 the candidates based on their ranking scores. In some instances, a candidate with a higher ranking score is ranked higher. The video recommendation module 240 provides 570, for display to the target user, one or more of the candidates that are above a threshold level in the ranking. For example, the video recommendation module 240 provides the highest ranked candidate for display in the newsfeed. As another example, the video recommendation module 240 provides one or more of the top five candidates for display to the target user. In embodiments where the request for content is a request for a newsfeed, the video recommendation module 240 provides the recommended candidates for display in the newsfeed requested by the target user.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving a plurality of live videos for streaming to client devices associated with users of an online system;
receiving a request for content from a target user during the streaming of the plurality of live videos;
in response to the request for content, dynamically identifying a topic for each of the plurality of live videos during the streaming of the live video;
selecting, from the plurality of live videos, a group of live videos as candidates based on the identified topics of the plurality of live videos;
for each candidate, determining a ranking score indicating a probability that the target user would positively interact with the candidate if the candidate is presented to the target user in the newsfeed by:
identifying a plurality of types of positive interaction,
obtaining a weight for each of the plurality of types of positive interaction,
for each identified type of positive interaction, determining a probability that the target user would conduct the identified type of positive interaction with the candidate if the candidate is presented to the target user, and
obtaining a weighted aggregation of the probabilities of the plurality of types of positive interaction based on the weights of the plurality of types of positive interaction;
ranking the candidates based on the ranking scores of the candidates;
providing one or more of the candidates for display to the target user based on the ranking.

2. The method of claim 1, wherein dynamically identifying the topic for each of the plurality of live videos during the streaming of the live video comprises:
identifying the topic for each of the plurality of live videos based on an image frame being streamed at the time when the target user's request is received.

3. The method of claim 2, wherein dynamically identifying the topic for each of the plurality of live videos during the streaming of the live video comprises:

identifying an object in the image frame being streamed at the time when the target user's request is received; and determining the topic based on the object.

4. The method of claim 1, wherein selecting the group of live videos as candidates for presentation to the target user comprises:

retrieving an interest of the target user from a user profile of the target user maintained at the online system;

determining whether an identified topic of a live video matches the retrieved interest of the target user; and based on the identified topic matching the retrieved interest, selecting the live video as a candidate.

5. The method of claim 1, further comprising:

receiving a second request for content from a target user during the streaming of the plurality of live videos;

in response to the second request for content, dynamically identifying a second topic for each of the plurality of live videos during the streaming of the live video;

selecting a second group of live videos as candidates based on the second topics of the plurality of live videos, the second group of live videos being different from the group of live videos; and providing one or more of the candidates in the second group for display to the target user.

6. The method of claim 1, wherein determining a probability that the target user would conduct the identified type of positive interaction with the candidate if the candidate is presented to the target user comprises:

inputting one or more characteristics of the target user into a machine learning model that was trained based on characteristics of other users and interactions taken by the other users on the candidate or on other live videos;

the machine learning model outputting the probability that the target user would conduct the identified type of positive interaction with the candidate if the candidate is presented to the target user.

7. The method of claim 1, wherein the request for content is a request for a newsfeed and the one or more candidates that are above a threshold level in the ranking are provided for display to the target user in the newsfeed requested by the target user.

8. A non-transitory computer-readable memory storing executable computer program instructions, the instructions executable to perform operations comprising:

receiving a plurality of live videos for streaming to client devices associated with users of an online system;

receiving a request for content from a target user during the streaming of the plurality of live videos;

in response to the request for content, dynamically identifying a topic for each of the plurality of live videos during the streaming of the live video;

selecting, from the plurality of live videos, a group of live videos as candidates based on the identified topics of the plurality of live videos;

for each candidate, determining a ranking score indicating a probability that the target user would positively interact with the candidate if the candidate is presented to the target user in the newsfeed by:

identifying a plurality of types of positive interaction, obtaining a weight for each of the plurality of types of positive interaction, for each identified type of positive interaction, determining a probability that the target user would conduct the identified type of positive interaction with the candidate if the candidate is presented to the target user, and obtaining a weighted aggregation of the probabilities of the plurality of types of positive interaction based on the weights of the plurality of types of positive interaction;

ranking the candidates based on the ranking scores of the candidates;

providing one or more of the candidates for display to the target user based on the ranking.

9. The non-transitory computer-readable memory of claim 8, wherein dynamically identifying the topic for each of the plurality of live videos during the streaming of the live video comprises:

identifying the topic for each of the plurality of live videos based on an image frame being streamed at the time when the target user's request is received.

10. The non-transitory computer-readable memory of claim 9, wherein dynamically identifying the topic for each of the plurality of live videos during the streaming of the live video comprises:

identifying an object in the image frame being streamed at the time when the target user's request is received; and determining the topic based on the object.

11. The non-transitory computer-readable memory of claim 8, wherein selecting the group of live videos as candidates for presentation to the target user comprises:

retrieving an interest of the target user from a user profile of the target user maintained at the online system;

determining whether an identified topic of a live video matches the retrieved interest of the target user; and based on the identified topic matching the retrieved interest, selecting the live video as a candidate.

12. The non-transitory computer-readable memory of claim 8, wherein the operations further comprise:

receiving a second request for content from a target user during the streaming of the plurality of live videos;

in response to the second request for content, dynamically identifying a second topic for each of the plurality of live videos during the streaming of the live video;

selecting a second group of live videos as candidates based on the second topics of the plurality of live videos, the second group of live videos being different from the group of live videos; and providing one or more of the candidates in the second group for display to the target user.

13. The non-transitory computer-readable memory of claim 8, wherein determining a probability that the target user would conduct the identified type of positive interaction with the candidate if the candidate is presented to the target user comprises:

inputting one or more characteristics of the target user into a machine learning model that was trained based on characteristics of other users and interactions taken by the other users on the candidate or on other live videos;

the machine learning model outputting the probability that the target user would conduct the identified type of positive interaction with the candidate if the candidate is presented to the target user.

14. The non-transitory computer-readable memory of claim 8, wherein the request for content is a request for a newsfeed and the one or more candidates that are above a threshold level in the ranking are provided for display to the target user in the newsfeed requested by the target user.

15. A computer system, comprising:

a computer processor for executing computer program instructions; and a non-transitory computer-readable memory storing computer program instructions executable by the computer processor to perform operations comprising:
receiving a plurality of live videos for streaming to client devices associated with users of an online system;
receiving a request for content from a target user during the streaming of the plurality of live videos;
in response to the request for content, dynamically identifying a topic for each of the plurality of live videos during the streaming of the live video;
selecting, from the plurality of live videos, a group of live videos as candidates based on the identified topics of the plurality of live videos;
for each candidate, determining a ranking score indicating a probability that the target user would positively interact with the candidate if the candidate is presented to the target user in the newsfeed by:
identifying a plurality of types of positive interaction,
obtaining a weight for each of the plurality of types of positive interaction,
for each identified type of positive interaction, determining a probability that the target user would conduct the identified type of positive interaction with the candidate if the candidate is presented to the target user, and
obtaining a weighted aggregation of the probabilities of the plurality of types of positive interaction based on the weights of the plurality of types of positive interaction;
ranking the candidates based on the ranking scores of the candidates;
providing one or more of the candidates for display to the target user based on the ranking.

16. The computer system of claim 15, wherein dynamically identifying the topic for each of the plurality of live videos during the streaming of the live video comprises:
identifying the topic for each of the plurality of live videos based on an image frame being streamed at the time when the target user's request is received.

17. The computer system of claim 16, wherein dynamically identifying the topic for each of the plurality of live videos during the streaming of the live video comprises:
identifying an object in the image frame being streamed at the time when the target user's request is received; and
determining the topic based on the object.

18. The computer system of claim 15, wherein selecting the group of live videos as candidates for presentation to the target user comprises:
retrieving an interest of the target user from a user profile of the target user maintained at the online system;
determining whether an identified topic of a live video matches the retrieved interest of the target user; and
based on the identified topic matching the retrieved interest, selecting the live video as a candidate.

19. The computer system of claim 15, further comprising:
receiving a second request for content from a target user during the streaming of the plurality of live videos;
in response to the second request for content, dynamically identifying a second topic for each of the plurality of live videos during the streaming of the live video;
selecting a second group of live videos as candidates based on the second topics of the plurality of live videos, the second group of live videos being different from the group of live videos; and
providing one or more of the candidates in the second group for display to the target user.

20. The computer system of claim 15, wherein determining a probability that the target user would conduct the identified type of positive interaction with the candidate if the candidate is presented to the target user comprises:
inputting one or more characteristics of the target user into a machine learning model that was trained based on characteristics of other users and interactions taken by the other users on the candidate or on other live videos;
the machine learning model outputting the probability that the target user would conduct the identified type of positive interaction with the candidate if the candidate is presented to the target user.

* * * * *